United States Patent
Bates

[15] 3,684,356
[45] Aug. 15, 1972

[54] TEMPLE BOOTS
[72] Inventor: Howard E. Bates, 17135 Rockdale, Detroit, Mich. 48219
[22] Filed: April 9, 1970
[21] Appl. No.: 26,833

[52] U.S. Cl. .............................. 351/123, 351/122
[51] Int. Cl. ............................................. G02c 5/14
[58] Field of Search ................... 351/122, 123, 320

[56] References Cited

UNITED STATES PATENTS

| | | | |
|---|---|---|---|
| 1,806,464 | 5/1931 | Housley | 351/123 |
| 3,042,548 | 7/1962 | Aikens | 351/122 X |
| 2,502,734 | 4/1950 | Lyons | 351/122 |
| 2,561,402 | 7/1951 | Nelson | 351/123 |

FOREIGN PATENTS OR APPLICATIONS 647,864  12/1950  Great Britain............351/123

*Primary Examiner*—David Schonberg
*Assistant Examiner*—John W. Leonard
*Attorney*—David A. Maxon

[57] ABSTRACT

This invention relates to rubberlike boots that are applied to the ends of the temple arms of glasses for increasing the friction between eyeglasses and the head of the wearer thereby maintaining the position of the eyeglases on the wearer without slippage.

1 Claim, 8 Drawing Figures

PATENTED AUG 15 1972    3,684,356
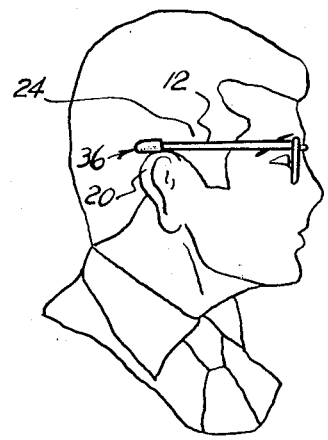
FIG. 1
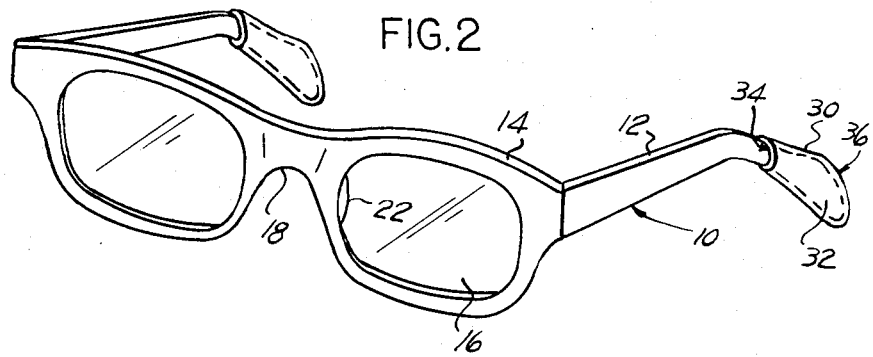
FIG. 2
FIG. 3
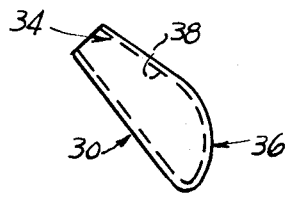
FIG. 4
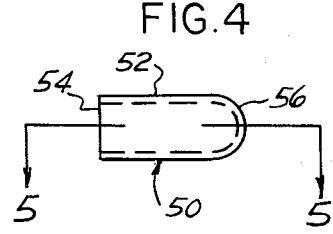
FIG. 6
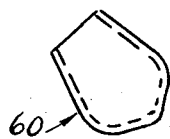
FIG. 7
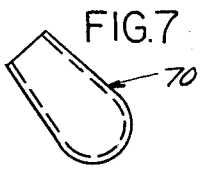
FIG. 8
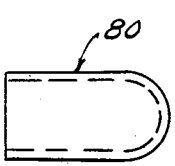
FIG. 5
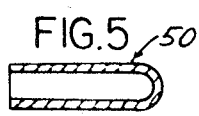
INVENTOR
HOWARD BATES
BY David A. Maxon
ATTORNEY

TEMPLE BOOTS

This invention relates generally to eyeglass frames. More specifically, this invention relates to apparatus and method for preventing slippage of eyeglass frames on the head of a wearer, particularly plastic frames.

In the optical industry, the problem of the slippage of eye glasses on the wearer has been a problem for many years. When eyeglasses slip, the wearer must often push them back to their correct position. This causes irritation between the skin of the wearer near the bridge of the nose and near the ear. It is uncomfortable and inconvenient. Also, during periods of activity of the wearer, the eyeglasses might actually fall off and break causing substantial inconvenience and property loss.

Many attempts have been made to cure this problem. These attempts often include expensive cumbersome and complicated apparatus for seeking positive engagement of the eyeglass frames with the head of the wearer. One such arrangement is to provide a spring arrangement for urging the temple arm into positive engagement with the head of the wearer. This is often both uncomfortable and does not actually solve the problem. The problem is not cured because the material used in the temple frames is usually of a smooth plastic that has a very low coefficient of friction with the skin or hair of the wearer.

The problem is often aggravated when the wearer is involved in sports or other vigorous activity. For example when playing basketball, with conventional frames, even with the spring-urging means mentioned above, the wearer sweats and this decreases further the coefficient of friction between the temple arms and the skin or hair of the wearer. Thus when people play basketball they often have to use tape or use other inconvenient and uncomfortable means for holding eyeglasses which are not always effective in achieving that objective.

Accordingly, it is an objective of this invention to provide a novel means of maintaining adherence of the eyeglass frames with the wearer.

It is another object of this invention to provide a means of maintaining positive position of eyeglasses on the head of a wearer that is uncomplicated and inexpensive and yet highly effective.

These and other objects of this invention are provided by frictionally engaging boots made of a polyvinyl chloride on the ends of the temple arms of the eyeglass frames. In order to provide a neat appearance while accomplishing this objective, the boots are preferably made of a color or are transparent or translucent so as to blend with the color of the temple arms. The boots may be shaped in various shapes in conformity with the ends of the temple arms.

Other objects of this invention will appear in the following description and appended claims, referring to the accompanying drawings forming a part of this specification.

ON THE DRAWINGS

FIG. 1 shows the head of a wearer with the preferred embodiment of this invention;

FIG. 2 is a three dimensional view of the eyeglasses shown in FIG. 1 and somewhat enlarged therefrom;

FIG. 3 is a detailed view of the boots used on the eyeglass frames in FIG. 2;

FIG. 4 shows an alternative embodiment of the boots;

FIG. 5 is a cross-sectional view taken along with section lines of 5 — 5 of FIG. 4;

FIG. 6 shows another cross-sectional embodiment of the boots;

FIG. 7 shows a still further alternative embodiment of the boots;

FIG. 8 shows a still further alternative embodiment of the boots.

Before explaining the present invention in detail, it is to be understood that the invention is not limited in its application to the details of construction and arrangement of parts illustrated in the accompanying drawings since the invention is capable of other embodiments of being practiced or being carried out in various ways.

Also it is to be understood that the phraseology and terminology employed herein is for the purpose of description and not limitation.

AS SHOWN ON THE DRAWINGS

FIG. 2 illustrates glasses 10 used in the preferred embodiment of this invention. The eyeglasses 10 have temple arms 12 which are hingeably attached to eyeglass frame 14 and are rotatable with respect to the eyeglass frame 14 with an axis of rotation parallel to a plane which passes through frame 14 and perpendicular to a plane passing through the temple arms 12.

The eyeglass frame 14 contains lenses 16 and have a nose-bridging portion 18. The temple arms 12 are designed to extend to the top of or beyond the top of ears 20 of the wearer of the eyeglasses. The frames 14 have brackets or nose portions 22 which project toward the head of the wearer and are designed to rest on the side of the nose near the top of the nose.

When worn as illustrated in FIG. 1, the eyeglasses 10 have the temple arms arranged such that they engage, but not with pressure or substantial pressure, the side of the head near the temples 24. The eyeglasses 10 are provided with boots 30 which are near the end 32 of the temple arms 12.

The boots 30 are preferably made of a polyvinyl chloride or other rubberlike plastic substance or rubber substance that fit snugly on the temple arms 12 near the open end 34 of the boots 30. The boots 30 are hollow sheaths having closed end portions 36 and open-end portions 34.

As shown in FIG. 3, the preferred embodiment of the boot 30 has an inner wall surface 38 and an outer wall surface 40. The inner wall surface is designed to fit snugly against the outside surface of the temple arms 12 near the open end 34 of the boot 30. The inner walls 38 near the closed end portion 36 of the boot 30 are designed such that they do not have to fit as snugly and may even be somewhat loose and somewhat separated from the outside surface of the end of the temple arms 12 nearest to the end portion 36 of the boot 30.

As can be seen in the illustration of FIG. 3, and comparing it with the ends of the temple arms 12 in FIG. 2, in its preferred embodiment, this invention uses boots that are shaped to fit somewhat close to the shape of the temple arms themselves. However, in an alternative embodiment, as illustrated in FIGS. 4 and 5, the boot may be simply a combination of a cylindrical portion 52 which has an open end portion 54 and a hemispherical portion 56 closing the other end of the boot 50. So long as the mouth or open end portion 54 of the boot 50 fits snugly with the temple arm 12, there may not be a snug or exact fit of the hemispherical portion 56 with the end of the temple arm 12. FIGS. 6, 7, and 8 illustrate boot shapes 60, 70, 80 respectively. These shapes form different shapes of the ends of temple arms for various types of glass frames currently in use.

Because the boot 30 or alternative embodiment of the boot 50, 60, 70, and 80 are made of a rubberlike plastic substance of polyvinyl chloride or rubber itself, there is frictional engagement between these boots and the temples of the wearer that provide a higher coefficient of friction than material used in temple arm 12. Temple arm 12 is usually composed of a plastic having a smooth surface or possibly machine indentation in an otherwise smooth surface that provides very little frictional engagement between the glass-holding apparatus and the body of the wearer. Because of this lack of frictional engagement, eyeglasses tend to slip causing the wearer to have to adjust his eyeglasses from time to time. This adjustment and the slipping causes irritation between the surface of the body of the wearer and the eyeglasses, particularly around the top of the bridge of the nose and sometimes near the temple and ears as well. By providing the principal engagement with the rubberlike boots, the frictional engagement between the eyeglasses and the wearer is substantially increased so that very little, if any, slippage occurs. The result of greater comfort to the wearer of the eyeglasses is substantial.

Also, the positive engagement between the eyeglasses and temples is achieved by inexpensive and uncomplicated means.

I claim:
1. In eyeglasses, the improvements comprising:
plastic temple arms having increasing width along their length near their ends rotatably attached to eyeglass frames;
each of said temple arms having an end portion operable to engage the head of the wearer;
a boot member on each said end portion;
said boot member having a higher co-efficient of friction with the head of the wearer than the co-efficient of friction between a temple arm and a temple or ear lobe of the wearer;
said boot having an open end portion surrounding a portion of the temple arm near said end portion of the temple arm, and a closed end portion enclosing said end portion of the temple arm;
said boot member having an inner wall that conforms to the entire outer surface of said end of the temple arm;
said boot member being made of polyvinyl chloride;
the inner surface of said closed end portion fitting snugly against said end of the temple arm;
said boot having a shape prior to engagement with said end of said temple arm that conforms to the shape of said end of the temple arm;
said boot being held on said temple arm exclusively by frictional engagement therewith;
the exterior surface of said boot being non-corrugated and continuous, and the color of said boot matching the color of said templearm.

* * * * *